US011722381B1

(12) United States Patent
Wu (10) Patent No.: US 11,722,381 B1
(45) Date of Patent: Aug. 8, 2023

(54) METHOD AND SYSTEM FOR BUILDING POTENTIAL WIRELESS ACCESS NODE BASED ON SOFTWARE-AND-HARDWARE SEPARATION TECHNIQUES

(71) Applicant: INSTITUTE FOR INFORMATION INDUSTRY, Taipei (TW)

(72) Inventor: Ming-Ju Wu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 17/989,165

(22) Filed: Nov. 17, 2022

(30) Foreign Application Priority Data

Nov. 8, 2022 (TW) .................................. 111142496

(51) Int. Cl.
*G06F 15/177* (2006.01)
*H04L 41/40* (2022.01)
*H04L 41/0803* (2022.01)
*H04L 41/0895* (2022.01)

(52) U.S. Cl.
CPC .......... *H04L 41/40* (2022.05); *H04L 41/0803* (2013.01); *H04L 41/0895* (2022.05)

(58) Field of Classification Search
CPC .. H04L 41/40; H04L 41/0895; H04L 41/0803
USPC ........................................ 709/220, 222, 223
See application file for complete search history.

(56) References Cited

U.S. PATENT DOCUMENTS

| 9,037,633 B2 * | 5/2015 | Tukol .................... G06F 9/4451 709/221 |
| 2002/0066093 A1 * | 5/2002 | Yen ......................... G06F 8/656 717/169 |
| 2003/0050055 A1 * | 3/2003 | Ting .................. H04M 3/42178 455/419 |
| 2021/0092610 A1 * | 3/2021 | Viegas .................. H04W 24/08 |

* cited by examiner

*Primary Examiner* — Liang Che A Wang
(74) *Attorney, Agent, or Firm* — Li & Cai Intellectual Property (USA) Office (57) ABSTRACT

A system and a method for building a potential wireless access node based on software-and-hardware-separation techniques are provided. The system includes first and second electronic devices. The first electronic device includes a host and a software-defined radio device. The method includes configuring the host to: set a target application, a target operating system, a target hardware platform and a target radio platform to serve as a target combination; download an executable file corresponding to the target combination from the second electronic device or establish the executable file corresponding to the target combination; in response to the executable file corresponding to the target combination being downloaded or established, execute the executable file corresponding to the target combination, and determine whether the software-defined radio device complies with a radio standard specification of the target application, and to take the first electronic device as the potential wireless access node.

18 Claims, 4 Drawing Sheets

METHOD AND SYSTEM FOR BUILDING POTENTIAL WIRELESS ACCESS NODE BASED ON SOFTWARE-AND-HARDWARE SEPARATION TECHNIQUES

CROSS-REFERENCE TO RELATED PATENT APPLICATION

This application claims the benefit of priority to Taiwan Patent Application No. 111142496, filed on Nov. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method and system for building a potential wireless access node, and more particularly to a method and a system for building a potential wireless access node based on software-and-hardware separation techniques.

BACKGROUND OF THE DISCLOSURE

In the new generation mobile communication technology, a wireless access node can be composed of software and hardware from multiple suppliers. For example, the fifth-generation mobile networks technology introduces an open radio access network (O-RAN) architecture to allow a base station to be composed of software and hardware from different suppliers. That is, although the software and hardware of the base station can be separated, deployment of wireless private network still faces issues such as technical difficulties and high cost, and there is no standard protocol for building a potential wireless network access node based on software-and-hardware separation techniques.

SUMMARY OF THE DISCLOSURE

In response to the above-referenced technical inadequacies, the present disclosure provides a method and a system for building a potential wireless access node based on software-and-hardware separation techniques, to reduce technical level and cost required for deploying wireless private network.

In one aspect, the present disclosure provides a method for building a potential wireless access node based on software-and-hardware separation techniques, the method is suitable for a system that includes a first electronic device and at least one second electronic device communicatively connected to the first electronic device. The first electronic device includes a host and a software-defined radio device electrically connected to the host. The method includes the following steps: configuring the host to set a target application, a target operating system, a target hardware platform and a target radio platform to serve as a target combination; configuring the host to obtain combination information from and shared by the at least one second electronic device, in which the combination information includes a plurality of combinations that define corresponding relationships among a plurality of applications, a plurality of operating systems, a plurality of hardware platforms and a plurality of radio platforms; configuring the host to determine whether or not the target combination exists in the plurality of combinations shared by the at least one second electronic device, in which each of the plurality of combinations corresponds to an executable file; in response to determining that the target combination exists in the plurality of combinations shared by the at least one second electronic device, configuring the host to download the executable file corresponding to the target combination from the at least one second electronic device; in response to determining that the target combination does not exist in the plurality of combinations shared by the at least one second electronic device, configuring the host to establish the executable file corresponding to the target combination according to the target application, the target operating system, the target hardware platform and the target radio platform; in response to the executable file corresponding to the target combination being downloaded or established, configuring the host to execute the executable file corresponding to the target combination, and test the software-defined radio device to determine whether or not the software-defined radio device complies with a radio standard specification of the target application; and in response to determining that the software-defined radio device complies with the radio standard specification of the target application, configuring the host to take the first electronic device as the potential wireless access node.

In another aspect, the present disclosure provides a system for building a potential wireless access node based on software-and-hardware-separation techniques, the system includes a first electronic device and at least one second electronic device communicatively connected to the first electronic device. The first electronic device includes a host and a software-defined radio device electrically connected to the host, and the host is configured to: set a target application, a target operating system, a target hardware platform and a target radio platform to serve as a target combination; obtain combination information from and shared by the at least one second electronic device, wherein the combination information includes a plurality of combinations that define corresponding relationships among a plurality of applications, a plurality of operating systems, a plurality of hardware platforms and a plurality of radio platforms; determine whether or not the target combination exists in the plurality of combinations shared by the at least one second electronic device, wherein each of the plurality of combinations corresponds to an executable file; in response to determining that the target combination exists in the plurality of combinations shared by the at least one second electronic device, download the executable file corresponding to the target combination from the at least one second electronic device; in response to determining that the target combination does not exist in the plurality of combinations shared by the at least one second electronic device, establish the executable file corresponding to the target combination according to the target application, the target operating system, the target hardware platform and the target radio platform; in response to the executable file corresponding to the target combination being downloaded or established, execute the executable file corresponding to the target combination, and test the software-defined radio device to determine whether or not the software-defined radio device complies with a radio standard specification of the target application; and in response to determining that the software-defined radio device complies with the radio standard specification of the target application, take the first electronic device as the potential wireless access node.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
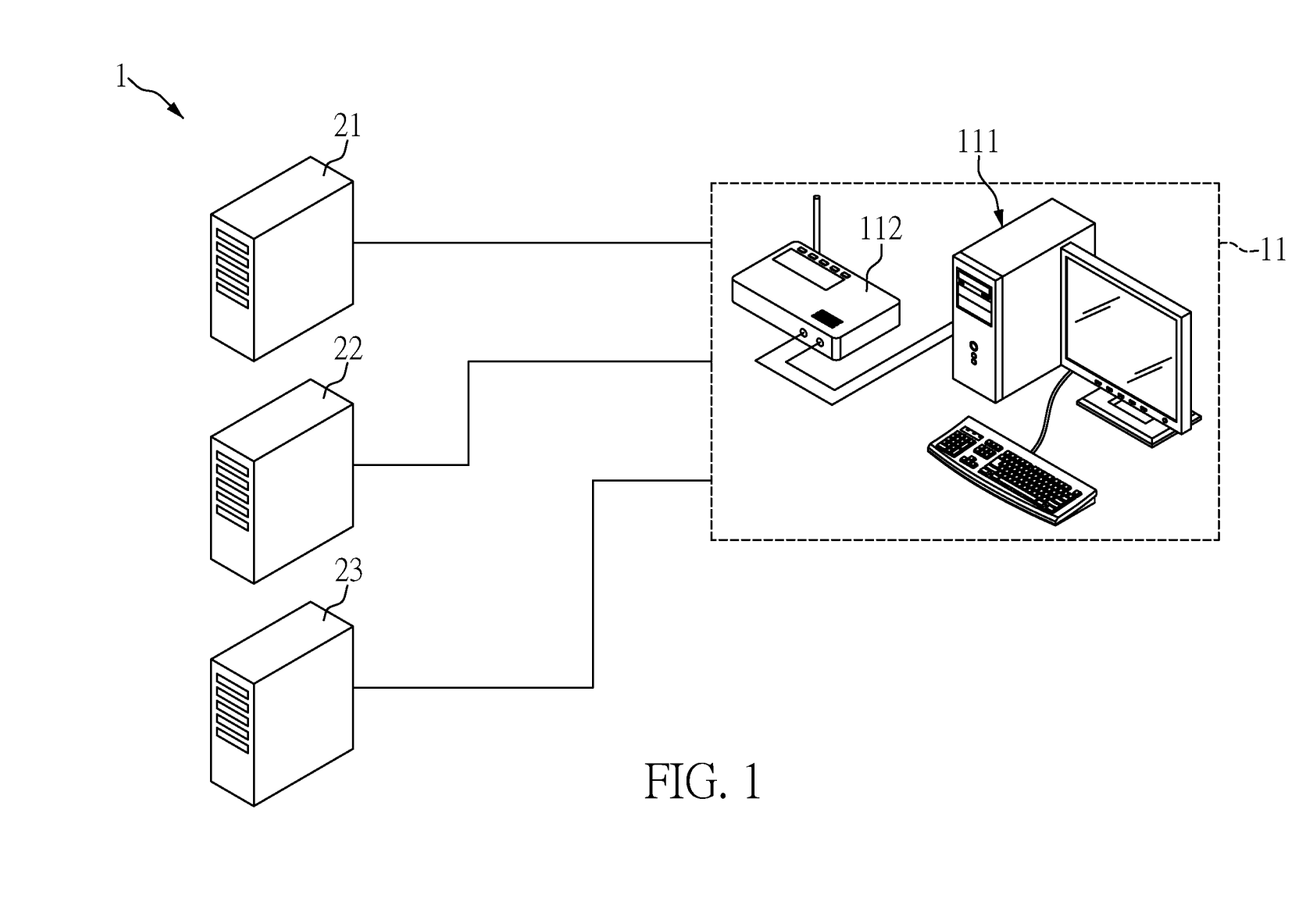
FIG. 1 is a schematic diagram of a system for building a potential wireless access node based on software-and-hardware separation techniques according to one embodiment of the present disclosure.
Figure 2:
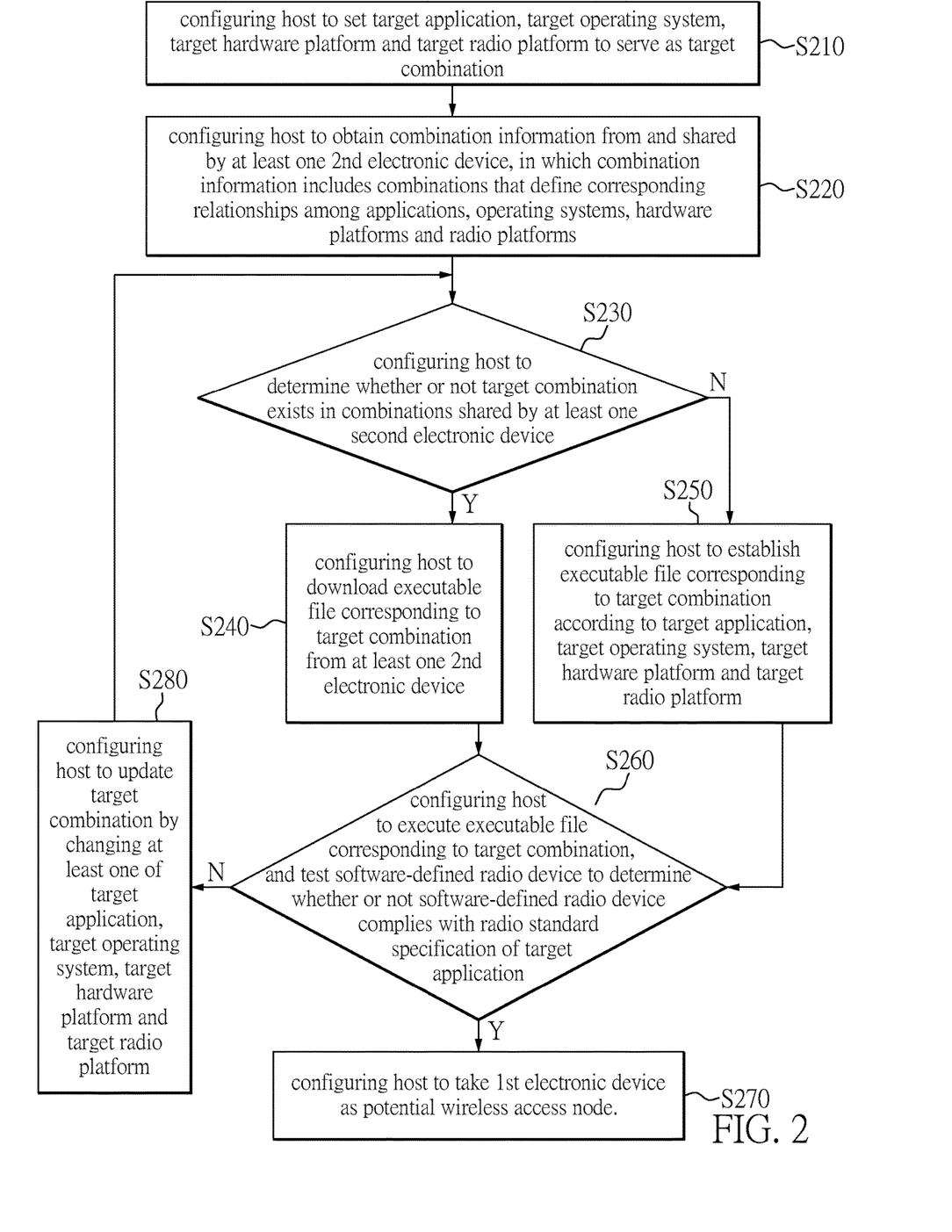
FIG. 2 is a flowchart of a method for building a potential wireless access node based on software-and-hardware separation techniques according to one embodiment of the present disclosure.

Reference is made to FIGS. 1 and 2, FIG. 1 is a schematic diagram of a system 1 for building a potential wireless access node based on software-and-hardware separation techniques according to one embodiment of the present disclosure, and FIG. 2 is a flowchart of a method for building a potential wireless access node based on software-and-hardware separation techniques according to one embodiment of the present disclosure. As shown in FIG. 1, the system 1 includes a first electronic device 11 and at least one second electronic device communicatively connected to the first electronic device 11.

It should be noted that, although the number of the at least one second electronic device being three is taken as an example (i.e., second electronic devices 21, 22 and 23) in this embodiment, the number of the at least one second electronic device is not limited to a specific quantity in the present disclosure. In addition, the first electronic device 11 includes a host 111 and a software-defined radio device 112 electrically connected to the host 111. The host 111 in this embodiment can be a personal computer (PC) that includes a general-purpose processor (GPP), but the present disclosure is not limited thereto.

Specifically, the method of FIG. 2 is applicable to the system 1 of FIG. 1 and includes the following steps. Step S210: configuring the host 111 to set a target application, a target operating system, a target hardware platform and a target radio platform to serve as a target combination.

Next, the method proceeds to step S220: configuring the host 111 to obtain combination information from and shared by the at least one second electronic device, in which the combination information includes a plurality of combinations that define corresponding relationships among a plurality of applications, a plurality of operating systems, a plurality of hardware platforms and a plurality of radio platforms. That is, the aforementioned at least one second electronic device can share multiple combinations, and each combination is a combination of one application, one operating system, one hardware platform, and one radio platform.

The applications in this embodiment includes a fifth-generation mobile networks (5G) base station (i.e., gNodeB, (gNB)), a fourth-generation mobile networks (4G) base station (i.e., eNodeB, (eNB)), a narrowband Internet of Things (NB-IoTs) base station (i.e., NB-IoT eNB), and a wireless network access point (i.e., WI-FI AP). In addition, the operating systems can include Ubuntu, Fedora and CentOS, etc., the hardware platforms can include x86, x86 SIMD, x86 AVX, ARM, etc., and the radio platforms can include USRP N, USRP B, USRP X, Blade RF, Amari RF, and Express MIMO, etc., but the present disclosure is not limited thereto.

Furthermore, the host 111 can be configured to, for example, set gNB, Ubuntu, x86 and USRP N as the target application, the target operating system, the target hardware platform and the target radio platform to serve as the target combination, but the present disclosure is not limited thereto. That is, the first electronic device 11 can be used as the 5G base station, the 4G base station, the NB-IoT base station, or the wireless network access point according to the target application set by the host 111.

In this embodiment, the host 111 (i.e., the PC) can be configured by a user through a user interface, to set the target application, the target operating system, the target hardware platform and the target radio platform, but the present disclosure is not limited thereto. In other embodiments, the user of the host 111 can set the target application, and the target operating system, and a built-in program of the host 111 can be executed to detect the operating system, the hardware platform and the radio platform that are usable by the host 111, so as to set the target hardware platform and the target radio platform.

Next, the method proceeds to step S230: configuring the host 111 to determine whether or not the target combination exists in the combinations shared by the at least one second electronic device, in which each of the plurality of combinations corresponds to an executable file. If the determination is affirmative (e.g., "Y" as shown in FIG. 2), the method proceeds to step S240; if the determination is negative (e.g., "N" as shown in FIG. 2), the method proceeds to step S250.

Step S240: configuring the host 111 to download the executable file corresponding to the target combination from the at least one second electronic device. Step S250: configuring the host 111 to establish the executable file corresponding to the target combination according to the target application, the target operating system, the target hardware platform and the target radio platform.

For the convenience of the following description, the second electronic devices 21, 22 and 23 sharing two combinations merely is taken as an example, and the two combinations (i.e., a first combination C1 and a second combination C2) correspond to executable files E1 and E2, respectively, and the first combination C1, the second combination C2, and the executable files E1 and E2 are omitted in FIG. 1.

If the first combination C1 shared by the second electronic devices 21, 22 and 23 is also a combination of gNB, Ubuntu, x86 and USRP N, the host 111 can determine that the target combination exists in the two combinations shared by the second electronic devices 21, 22 and 23. In response to determining that the target combination exists in the combinations shared by the second electronic devices 21, 22 and 23, the host 111 can download the executable file corresponding to the target combination (i.e., the executable file E1 corresponding to the first combination C1) from the second electronic device 21, 22 and 23.

Moreover, the second electronic devices 21, 22 and 23 can be peer-to-peer (P2P) devices that perform file sharing through a P2P mode, and each of the P2P devices further provides at least one uniform resource locator (URL) to share the executable file corresponding to one of the combinations. Therefore, in response to determining that the target combination exists in the combinations shared by the second electronic devices 21, 22 and 23 (i.e., the P2P devices), the host 111 can download the executable file corresponding to the target combination through the URL provided by one of the P2P devices.

For example, the second electronic device 21 can provide a URL A to share the executable file E1 corresponding to the first combination C1, the second electronic device 22 can provide a URL B to share the executable file E1 corresponding to the first combination C1, and the second electronic device 22 can provide a URL C to share the executable file E2 corresponding to the second combination C2, and the URL A, the URL B, and the URL C are also omitted in FIG. 1. Therefore, in response to the first combination C1 shared by the second electronic devices 21, 22 and 23 being as the same as the target combination set by the host 111, the host 111 can download the executable file E1 corresponding to the first combination C1 through the URL A provided by the second electronic device 21.

It can be seen that, the host 111 in this embodiment can also download the executable file E1 corresponding to the first combination C1 from the second electronic device 21 through the P2P mode, such as a transmission protocol of InterPlanetary File System (IPFS). In addition, in other embodiments, the at least one second electronic device can be a server, and in response to determining that the target combination exists in the combinations shared by the server, the host 111 can download the executable file corresponding to the target combination from the server.

On the other hand, if the first combination C1 is a combination of gNB, Ubuntu, x86 SIMD and USRP N, and the second combination C2 is a combination of gNB, Ubuntu, x86 SIMD and USRP B, the host 111 can determine that the target combination does not exist in the two combinations shared by the second electronic devices 21, 22 and 23. In response to determining that the target combination does not exist in the combinations shared by the second electronic devices 21, 22 and 23, the host 111 can establish an executable file corresponding to the target combination according to source codes of the target application, the target operating system, the target hardware platform and the target radio platform.

Specifically, O-RAN alliance have proposed open-source technical solutions. Therefore, the host 111 can directly obtain the source codes of the target application, the target operating system, the target hardware platform and the target radio platform (e.g., gNB, Ubuntu, x86 and USRP N) from suppliers, so as to establish the executable file corresponding to the target combination according to the source codes. For example, the host 111 can download the source codes of OAI or srsRAN from suppliers, and install necessary software (e.g., library and dll files) to compile the source codes, so as to generate the executable file corresponding to the target combination. In addition, after the host 111 downloads or establishes the executable file corresponding to the target combination, the method proceeds to step S260.

Step S260: configuring the host 111 to execute the executable file corresponding to the target combination, and test the software-defined radio device to determine whether or not the software-defined radio device complies with a radio standard specification of the target application. If the determination is affirmative (e.g., "Y" as shown in FIG. 2), the method proceeds to step S270; if the determination is negative (e.g., "N" as shown in FIG. 2), the method proceeds to step S280. In practice, the host 111 that executes the executable file corresponding to the target combination can use the software-defined radio device 112 to perform default data transmission, so as to test the software-defined radio device 112 and determine whether or not the software-defined radio device 112 complies with the radio standard specification of the target application.

Step S270: configuring the host 111 to take the first electronic device 11 as the potential wireless access node. Step S280: configuring the host 111 to update the target combination by changing at least one of the target application, the target operating system, the target hardware platform and the target radio platform. In addition, after step S280 is performed, the method returns to step S230.

More specifically, the host 111 can determine whether or not a sampling frequency, a bandwidth or a frequency range of the software-defined radio device 112 that performs the default data transmission complies with a standard sampling frequency, a standard bandwidth or a standard frequency range of the target application (e.g., gNB). If the determination is affirmative (e.g., "Y" as shown in FIG. 2), it means that the software-defined radio device 112 complies with the radio standard specification of the target application, therefore the host 111 can be configured to take the first electronic device 11 as the potential wireless access node in step S270; if the determination is negative (e.g., "N" as shown in FIG. 2), it means that the software-defined radio device 112 does not comply with the radio standard specification of the target application, which also means that the first electronic device 11 cannot be used as the potential wireless access node.

It should be noted that the so-called potential wireless access node refers to an electronic device that is not configured as an existing wireless access node and capable of providing inherent electronic device services. For example, the first electronic device 11 taken as the potential wireless access node can still provide inherent PC services thereof, and can also be used as the 5G base station, the 4G base station, the NB-IoT base station, or the wireless network access point.

On the other hand, since an unsuitable application, an unsuitable operating system, an unsuitable hardware platform or an unsuitable radio platform set by the host 111 may make the first electronic device 11 to be ineligible for being the potential wireless access node, the host 111 can be configured to update the target combination by changing (e.g., resetting) at least one of the target application, the target operating system, the target hardware platform, and the target radio platform in step S280.

For example, given that the host 111 originally set gNB, Ubuntu, x86 and USRP N as the target application, the target operating system, the target hardware platform and the target radio platform, the host 111 can then be configured to update the target combination to gNB, Ubuntu, x86 SIMD and USRP N. Since the details after the method returns to step S230 are the same as the previous embodiment, the repetitive descriptions are omitted hereinafter.

It should be noted that the first electronic device 11 taken as the potential wireless access node can also share the target combination set by the host 111, that is, the first electronic device 11 at this time can be equivalent to another second electronic device. Therefore, in response to determining that the software-defined radio device 112 complies with the radio standard specification of the target application, the method of FIG. 2 can further include: configuring the host 111 to update a sharing table with the target combination.

Further, the host 121 of another first electronic device 12 can obtain the sharing table, and use the sharing table to determine whether or not the target combination set by the host 121 exists in the combinations shared by the first electronic device 11, and the first electronic device 12 and the host 121 thereof are omitted in FIG. 1. Similarly, in response to determining that the software-defined radio device 112 complies to the radio standard specification of the target application, the method of FIG. 2 can further include: configuring the host 111 to provide a URL for sharing the executable file corresponding to the target combination to the first electronic device 12.

As mentioned above, the first electronic device 11 can be used as a 5G base station, a 4G base station, a NB-IoTs base station or a wireless network access point according to the target application. Therefore, it should be understood that the first electronic device 11 taken as the potential wireless access node can be used to optimize a wireless signal coverage or fill a wireless signal blank region under an Internet-available condition. For example, reference can be made to FIG. 3, which is a schematic diagram showing a wireless signal coverage being optimized by the potential wireless access node under an Internet-available condition according to one embodiment of the present disclosure.

Figure 3:
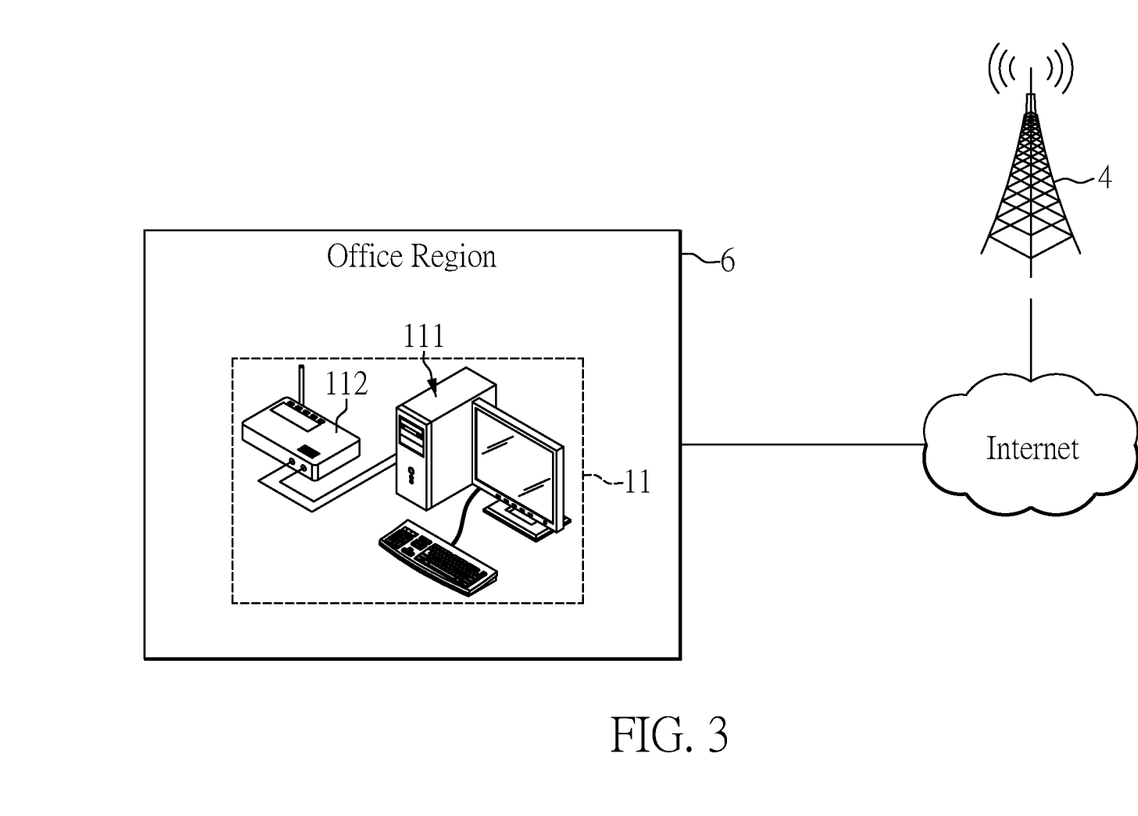
FIG. 3 is a schematic diagram showing a wireless signal coverage being optimized by the potential wireless access node under an Internet-available condition according to one embodiment of the present disclosure.

As shown in FIG. 3, an existing 5G base station 4 is usually arranged in an outdoor environment, and it is known that the wireless signal coverage of the 5G is relatively small. When a user equipment (UE) is used in an indoor environment, a reception quality and a connection rate of the UE may be affected by shading effect of buildings and materials of indoor partitions to be worse than that in the outdoor environment, such that signals may not even be received by the UE. Therefore, after utilizing the first electronic device 11 in the indoor environment (such as an office region 6 in this embodiment) as another 5G base station through the system and the method provided by the present disclosure, a core network of a telecom operator or a private network is accessible, the first electronic device 11 can therefore optimize the wireless signal coverage of the 5G in the office region 6 while maintaining an Internet 5 being uninterrupted. For example, the UE in the office region 6 can be provided with a subscriber identity module (SIM) or a private network SIM issued by a telecom operator, such that after completing procedures such as registration with a back-end core network and a packet data unit session (PDU) session establishment process through the wireless access of the first electronic device 11, a wireless Internet service can be obtained.

On the other hand, the first electronic device 11 taken as the potential wireless access node can also be used to generate or extend a wireless local area network (WLAN) in an Ad-Hoc mode. The WLAN in the Ad-Hoc mode is an architecture established based on point-to-point network connections. That is, multiple nodes of the WLAN in the Ad-Hoc mode can directly communicate wirelessly to one another for sharing files without going through the Internet. Therefore, reference can be made to FIG. 4, which is a schematic diagram showing an executable file being shared through a WLAN 7 in an Ad-Hoc mode under an Internet-unavailable condition.

Figure 4:
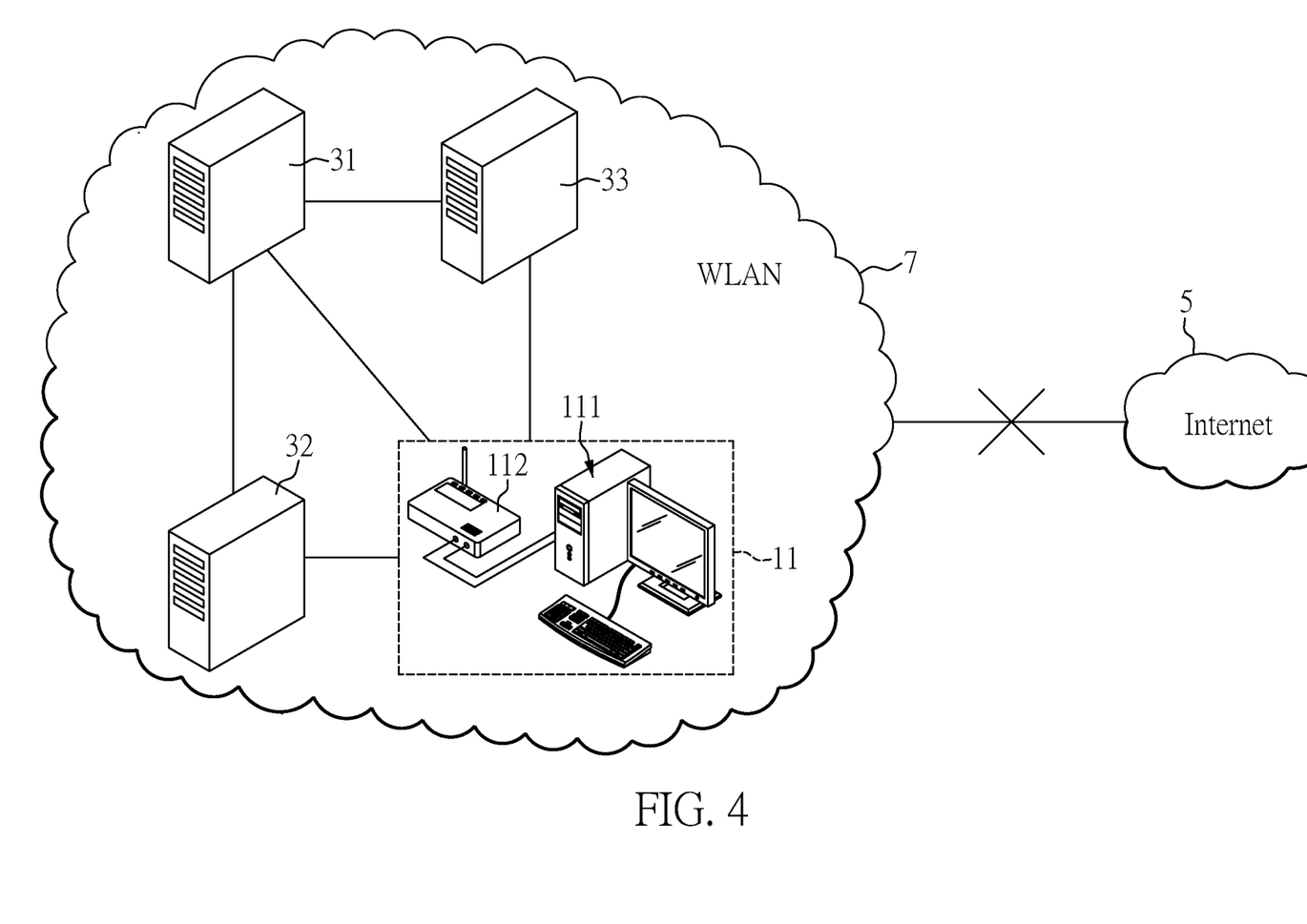
FIG. 4 is a schematic diagram showing an executable file being shared through a WLAN in an Ad-Hoc mode under an Internet-unavailable condition.

As shown in FIG. 4, in addition to sharing files through the P2P mode, the first electronic device 11 taken as the potential wireless access node can also be used to share the executable file corresponding to the target combination to other electronic devices (e.g., the third electronic devices 31, 32 and 33 in FIG. 4) through the WLAN 7 in the Ad-Hoc mode when the Internet 5 is interrupted due to, for example, natural disasters or wars.

In conclusion, in the method and system provided by the present disclosure, the potential wireless access node can be built in a standard protocol based on the software-and-hardware separation techniques, and since the first electronic device that includes the PC and the software-defined radio device can be taken as the potential wireless access node, the technical level and cost required for deploying the wireless private network can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for building a potential wireless access node based on software-and-hardware-separation techniques, for a system comprising a first electronic device and at least one second electronic device communicatively connected to the first electronic device, the first electronic device comprising a host and a software-defined radio device electrically connected to the host, and the method comprising the following steps:
- configuring the host to set a target application, a target operating system, a target hardware platform and a target radio platform to serve as a target combination;
- configuring the host to obtain combination information from and shared by the at least one second electronic device, wherein the combination information comprises a plurality of combinations which define corresponding relationships among a plurality of applications, a plurality of operating systems, a plurality of hardware platforms and a plurality of radio platforms;
- configuring the host to determine whether or not the target combination exists in the plurality of combinations shared by the at least one second electronic device, wherein each of the plurality of combinations corresponds to an executable file;
- in response to determining the target combination exists in the plurality of combinations shared by the at least one second electronic device, configuring the host to download the executable file corresponding to the target combination from the at least one second electronic device;
- in response to determining the target combination does not exist in the plurality of combinations shared by the at least one second electronic device, configuring the host to establish the executable file corresponding to the target combination according to the target application, the target operating system, the target hardware platform and the target radio platform;
- after the executable file corresponding to the target combination being downloaded or established, configuring the host to execute the executable file corresponding to the target combination, and test the software-defined radio device to determine whether or not the software-defined radio device complies with a radio standard specification of the target application; and
- in response to determining the software-defined radio device complies with the radio standard specification of the target application, configuring the host to take the first electronic device as the potential wireless access node.

2. The method according to claim 1, further comprising the following steps:
- in response to determining the software-defined radio device does not comply with the radio standard specification of the target application, configuring the host to update the target combination by changing at least one of the target application, the target operating system, the target hardware platform and the target radio platform, and returning to the step of configuring the host to determine whether or not the updated target combination exists in the plurality of combinations shared by the at least one second electronic device.

3. The method according to claim 1, wherein the host is a personal computer comprising a general-purpose processor.

4. The method according to claim 1, wherein the plurality of applications comprise a fifth-generation mobile networks (5G) base station, a fourth-generation mobile networks (4G) base station, a narrowband Internet of Things (NB-IoT) base station, and a wireless network access point, and the first electronic device is used as the 5G base station, the 4G base station, the NB-IoT base station or the wireless network access point according to the target application.

5. The method according to claim 1, wherein the at least one second electronic device is a server or a plurality of peer-to-peer (P2P) devices which perform file sharing through a P2P mode, and each of the P2P devices further provides at least one uniform resource locator (URL) to share the executable file corresponding to one of the plurality of combinations.

6. The method according to claim 5, further comprising:
- in response to determining the target combination exists in the plurality of combinations shared by the plurality of P2P devices, configuring the host to download the executable file corresponding to the target combination through the URL provided by one of the plurality of P2P devices.

7. The method according to claim 1, further comprising the following steps:
- in response to determining the software-defined radio device complies with the radio standard specification of the target application, configuring the host to update a sharing table with the target combination, and provide a URL for sharing the executable file corresponding to the target combination to another first electronic device.

8. The method according to claim 1, wherein the first electronic device which is taken as the potential wireless access node is configured to optimize a wireless signal coverage or fill a wireless signal blank region under an Internet-available condition.

9. The method according to claim 8, wherein the first electronic device which is taken as the potential wireless access node is further configured to generate or extend a wireless local area network (WLAN) in an Ad-Hoc mode, and the executable file corresponding to the target combination is shared through the WLAN in the Ad-Hoc mode under an Internet-unavailable condition.

10. A system for building a potential wireless access node based on software-and-hardware-separation techniques, the system comprising:
- a first electronic device; and
- at least one second electronic device communicatively connected to the first electronic device,
- wherein the first electronic device comprises a host and a software-defined radio device electrically connected to the host, and the host is configured to:
- set a target application, a target operating system, a target hardware platform and a target radio platform to serve as a target combination;
- obtain combination information from and shared by the at least one second electronic device, wherein the combination information comprises a plurality of combinations which define corresponding relationships among a plurality of applications, a plurality of operating systems, a plurality of hardware platforms and a plurality of radio platforms;
- determine whether or not the target combination exists in the plurality of combinations shared by the at least one second electronic device, wherein each of the plurality of combinations corresponds to an executable file;
- in response to determining the target combination exists in the plurality of combinations shared by the at least one second electronic device, download the executable file corresponding to the target combination from the at least one second electronic device;
- in response to determining the target combination does not exist in the plurality of combinations shared by the at least one second electronic device, establish the executable file corresponding to the target combination according to the target application, the target operating system, the target hardware platform and the target radio platform;

after the executable file corresponding to the target combination being downloaded or established, execute the executable file corresponding to the target combination, and test the software-defined radio device to determine whether or not the software-defined radio device complies with a radio standard specification of the target application; and in response to determining the software-defined radio device complies with the radio standard specification of the target application, take the first electronic device as the potential wireless access node.

11. The system according to claim 10, wherein the host is further configured to:

in response to determining the software-defined radio device does not comply with the radio standard specification of the target application, update the target combination by changing at least one of the target application, the target operating system, the target hardware platform and the target radio platform, and return to the step of determining whether or not the updated target combination exists in the plurality of combinations shared by the at least one second electronic device.

12. The system according to claim 10, wherein the host is a personal computer comprising a general-purpose processor.

13. The system according to claim 10, wherein the plurality of applications comprise a fifth-generation mobile networks (5G) base station, a fourth-generation mobile networks (4G) base station, a narrowband Internet of Things (NB-IoT) base station, and a wireless network access point, and the first electronic device is used as the 5G base station, the 4G base station, the NB-IoT base station or the wireless network access point according to the target application.

14. The system according to claim 10, wherein the at least one second electronic device is a server or a plurality of peer-to-peer (P2P) devices which perform file sharing through a P2P mode, and each of the P2P devices further provides at least one uniform resource locator (URL) to share the executable file corresponding to one of the plurality of combinations.

15. The system according to claim 14, wherein, in response to determining the target combination exists in the plurality of combinations shared by the plurality of P2P devices, the host is configured to download the executable file corresponding to the target combination through the URL provided by one of the plurality of P2P devices.

16. The system according to claim 10, wherein the host is further configured to:

in response to determining the software-defined radio device complies with the radio standard specification of the target application, update a sharing table with the target combination, and provide a URL for sharing the executable file corresponding to the target combination to another first electronic device.

17. The system according to claim 10, wherein the first electronic device which is taken as the potential wireless access node is configured to optimize a wireless signal coverage or fill a wireless signal blank region under an Internet-available condition.

18. The system according to claim 17, wherein the first electronic device which is taken as the potential wireless access node is further configured to generate or extend a wireless local area network (WLAN) in an Ad-Hoc mode, and the executable file corresponding to the target combination is shared through the WLAN in the Ad-Hoc mode under an Internet-unavailable condition.

* * * * *